(12) United States Patent
Westmoreland

(10) Patent No.: US 10,414,421 B1
(45) Date of Patent: Sep. 17, 2019

(54) FIREWOOD STORAGE BIN

(71) Applicant: Dennis Westmoreland, Bailey, CO (US)

(72) Inventor: Dennis Westmoreland, Bailey, CO (US)

( * ) Notice: Subject to any disclaimer, the term of this patent is extended or adjusted under 35 U.S.C. 154(b) by 0 days.

(21) Appl. No.: 16/195,986

(22) Filed: Nov. 20, 2018

(51) Int. Cl.
*B62B 3/00* (2006.01)
*B62B 5/00* (2006.01)
*F24B 15/00* (2006.01)

(52) U.S. Cl.
CPC .............. *B62B 3/002* (2013.01); *B62B 5/00* (2013.01); *F24B 15/00* (2013.01); *B62B 2202/00* (2013.01)

(58) Field of Classification Search
CPC ......... B62B 3/003; B62B 3/005; B62B 3/002; B62B 3/12; B62B 3/102
USPC ........................ 280/79.3, 79.11, 47.34, 47.35
See application file for complete search history.

(56) References Cited

U.S. PATENT DOCUMENTS

| | | | | |
|---|---|---|---|---|
| 732,037 | A * | 6/1903 | Best ........................ | A47G 23/06 211/195 |
| 2,896,961 | A * | 7/1959 | Low ........................ | F24B 15/00 280/47.26 |
| 3,021,011 | A * | 2/1962 | Visneski .................... | B62B 3/04 108/55.3 |
| 3,187,901 | A * | 6/1965 | Wilson .................... | F24B 15/00 211/182 |
| 3,278,042 | A * | 10/1966 | Frydenberg ............... | B62B 3/04 280/35 |
| 3,415,532 | A * | 12/1968 | Fingerut .................. | A47F 5/135 280/33.998 |
| 3,669,464 | A * | 6/1972 | Linzmeier ................. | B62B 3/10 211/49.1 |
| 3,746,358 | A * | 7/1973 | Swick, Jr. ............... | B62B 3/002 280/651 |
| 3,759,538 | A * | 9/1973 | Fabiano .................. | A01G 20/30 280/47.35 |
| 3,840,243 | A * | 10/1974 | Rheinhart ............... | B62B 3/002 280/33.996 |
| 3,893,686 | A * | 7/1975 | Morgan .................. | B62B 3/002 280/651 |
| 3,894,753 | A * | 7/1975 | Ickes ...................... | B62B 3/104 193/25 R |
| 4,094,526 | A * | 6/1978 | Clarke ..................... | B62B 3/10 108/189 |
| 4,097,056 | A * | 6/1978 | Castellano ............... | B62B 3/14 280/33.991 |
| 4,099,735 | A * | 7/1978 | Becker, III ........... | B62B 5/0006 211/133.2 |

(Continued)

FOREIGN PATENT DOCUMENTS

CA 1123298 5/1982

*Primary Examiner* — Jeffrey J Restifo

(57) ABSTRACT

The firewood storage bin may store firewood for use in a fireplace or a wood burning stove. The firewood storage bin may capture wood chips, bark, dirt or other debris falling from the firewood in a removable tray located beneath the bin and may thereby keep a floor beneath the firewood storage bin clean. The firewood storage bin may be moveable by pushing the firewood storage bin over the floor on the plurality of wheels. The firewood storage bin may have a tool holder accessible at the top of one side for holding tools and may have one or more storage areas on the opposite side for storing accessories.

13 Claims, 5 Drawing Sheets

(56) References Cited

U.S. PATENT DOCUMENTS

| | | | | |
|---|---|---|---|---|
| 4,236,775 A * | 12/1980 | Haynes | F24B 1/199 | 211/49.1 |
| 4,264,081 A * | 4/1981 | Markham | F24B 15/00 | 211/49.1 |
| 4,275,665 A * | 6/1981 | Silverman | A47F 5/135 | 108/14 |
| 4,294,364 A * | 10/1981 | Bilbrey | F24B 15/00 | 211/182 |
| 4,349,213 A * | 9/1982 | Hirsch | B62B 1/00 | 126/283 |
| D266,708 S * | 10/1982 | Jean | D34/24 | |
| D270,939 S | 10/1983 | Stehlik | | |
| D287,618 S * | 1/1987 | Henderson | D23/410 | |
| 4,986,555 A * | 1/1991 | Andreen | A47L 13/10 | 280/47.35 |
| 5,280,933 A * | 1/1994 | Finneyfrock | F24B 15/00 | 211/49.1 |
| 5,324,054 A * | 6/1994 | Kleier | B62B 3/002 | 220/485 |
| 5,743,413 A * | 4/1998 | Noll | A47B 45/00 | 211/175 |
| 5,887,878 A * | 3/1999 | Tisbo | B62B 1/20 | 280/47.19 |
| D416,322 S | 11/1999 | Suher | | |
| 6,022,032 A * | 2/2000 | Savage | B62B 1/20 | 280/47.24 |
| 6,036,032 A * | 3/2000 | Moscatelli | F24B 15/00 | 211/60.1 |
| 6,203,036 B1 * | 3/2001 | LaVaute | B62B 3/006 | 280/79.2 |
| 6,206,385 B1 * | 3/2001 | Kern | B62B 3/02 | 280/47.35 |
| D488,553 S | 4/2004 | Dery | | |
| 6,786,503 B1 * | 9/2004 | Young | B62B 3/008 | 280/35 |
| 6,811,163 B1 * | 11/2004 | Gurule | B62B 3/002 | 280/79.3 |
| 6,997,332 B1 * | 2/2006 | Alexander | A47B 47/027 | 211/182 |
| 7,210,545 B1 * | 5/2007 | Waid | B60K 7/0007 | 180/19.1 |
| 7,322,586 B1 * | 1/2008 | Zettel | B62B 1/18 | 280/47.24 |
| 7,810,486 B2 * | 10/2010 | Bruno | A47J 37/0704 | 126/41 R |
| 7,815,202 B2 * | 10/2010 | Richards | A47F 5/135 | 211/126.8 |
| 7,857,328 B1 * | 12/2010 | Boss | B62B 1/14 | 280/47.131 |
| 7,857,329 B2 * | 12/2010 | Cai | A47B 31/00 | 211/134 |
| 8,641,061 B1 * | 2/2014 | Sims | B62B 3/022 | 280/651 |
| 8,764,031 B2 * | 7/2014 | Finstad, III | A47B 57/06 | 211/187 |
| 8,840,122 B1 * | 9/2014 | Cummins | B62B 3/005 | 280/47.35 |
| 2007/0189642 A1 | 8/2007 | Materna | | |

* cited by examiner

FIREWOOD STORAGE BIN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories for fireplaces and wood burning stoves, more specifically, a firewood storage bin.

SUMMARY OF INVENTION

The firewood storage bin may store firewood for use in a fireplace or a wood-burning stove. The firewood storage bin may capture wood chips, bark, dirt or other debris falling from the firewood in a removable tray located beneath the bin and may thereby keep a floor beneath the firewood storage bin clean. The firewood storage bin may be moveable by pushing the firewood storage bin over the floor on the plurality of wheels. The firewood storage bin may have a tool holder accessible at the top of one side for holding tools and may have one or more storage areas on the opposite side for storing accessories.

An object of the invention is to store firewood.

Another object of the invention is to provide wheels so that the firewood storage bin may be moved.

A further object of the invention is to provide a removable tray under the grill-like bottom to catch debris falling from the firewood.

Yet another object of the invention is to provide a tool holder and storage areas on the exterior sides of the firewood storage bin.

These together with additional objects, features and advantages of the firewood storage bin will be readily apparent to those of ordinary skill in the art upon reading the following detailed description of the presently preferred, but nonetheless illustrative, embodiments when taken in conjunction with the accompanying drawings.

In this respect, before explaining the current embodiments of the firewood storage bin in detail, it is to be understood that the firewood storage bin is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the firewood storage bin.

It is therefore important that the claims be regarded as including such equivalent construction insofar as they do not depart from the spirit and scope of the firewood storage bin. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
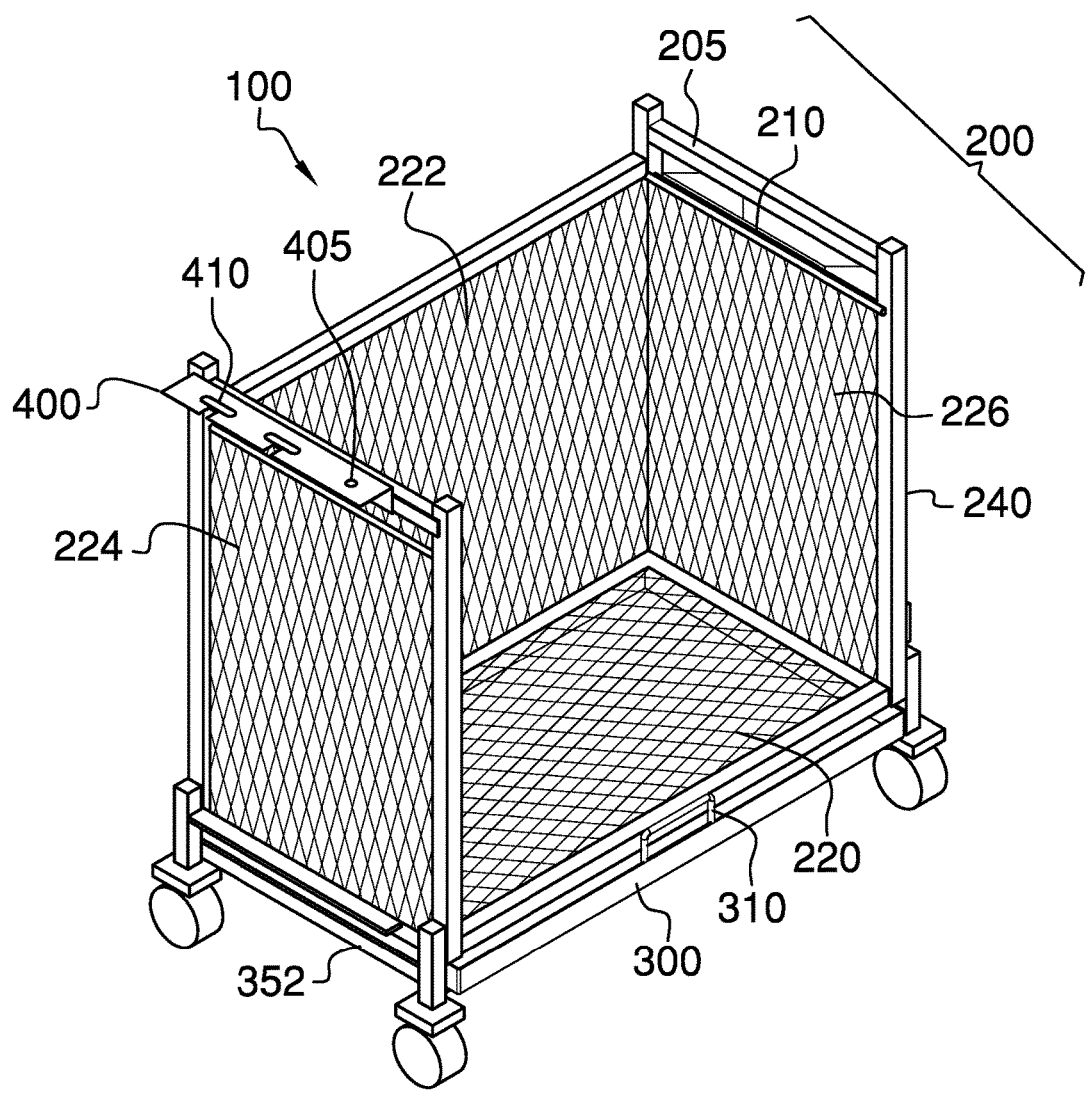
FIG. 1 is a perspective view of an embodiment of the disclosure.
Figure 2:
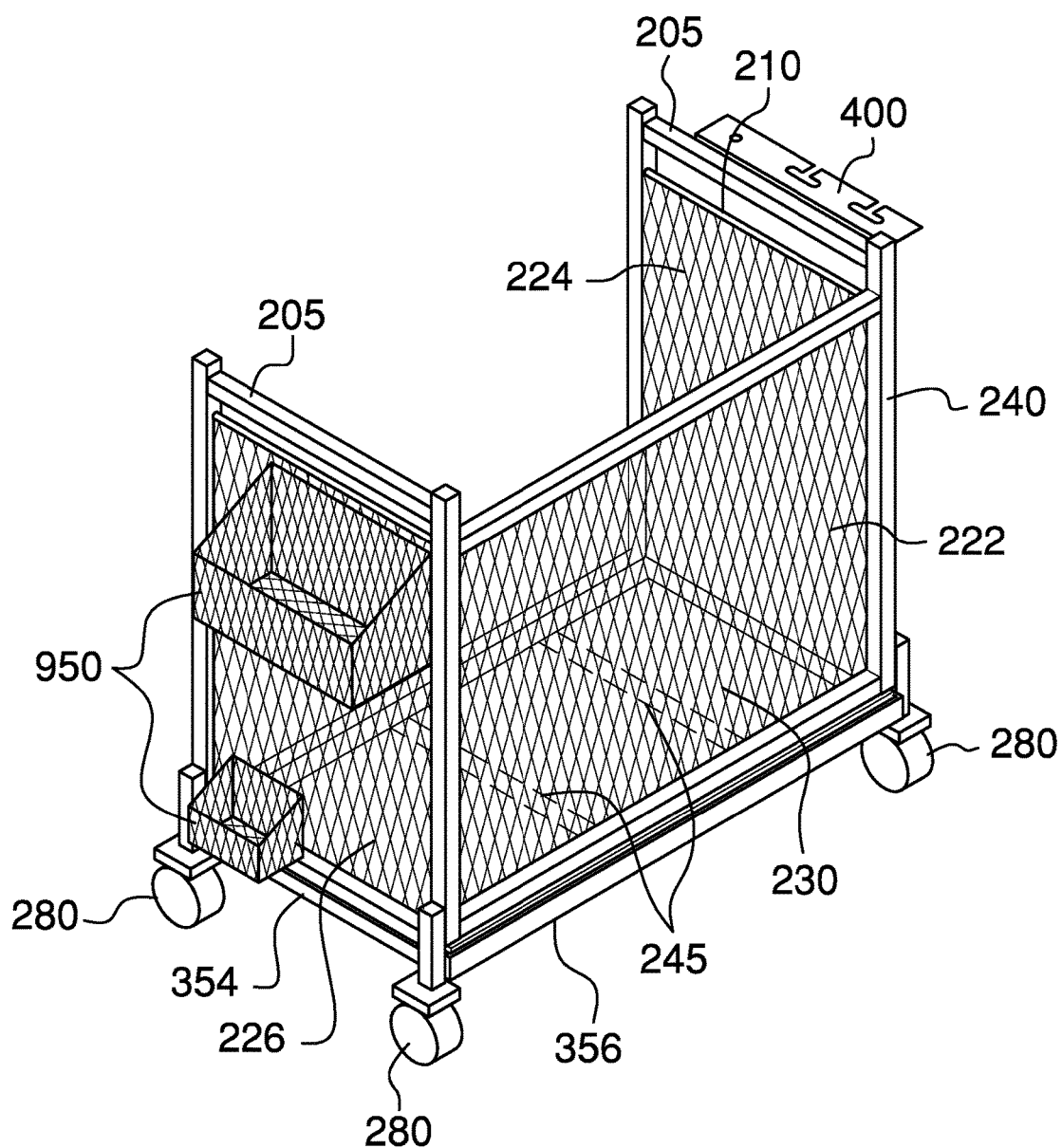
FIG. 2 is a reverse perspective view of an embodiment of the disclosure that comprises bottom cross braces.
Figure 3:
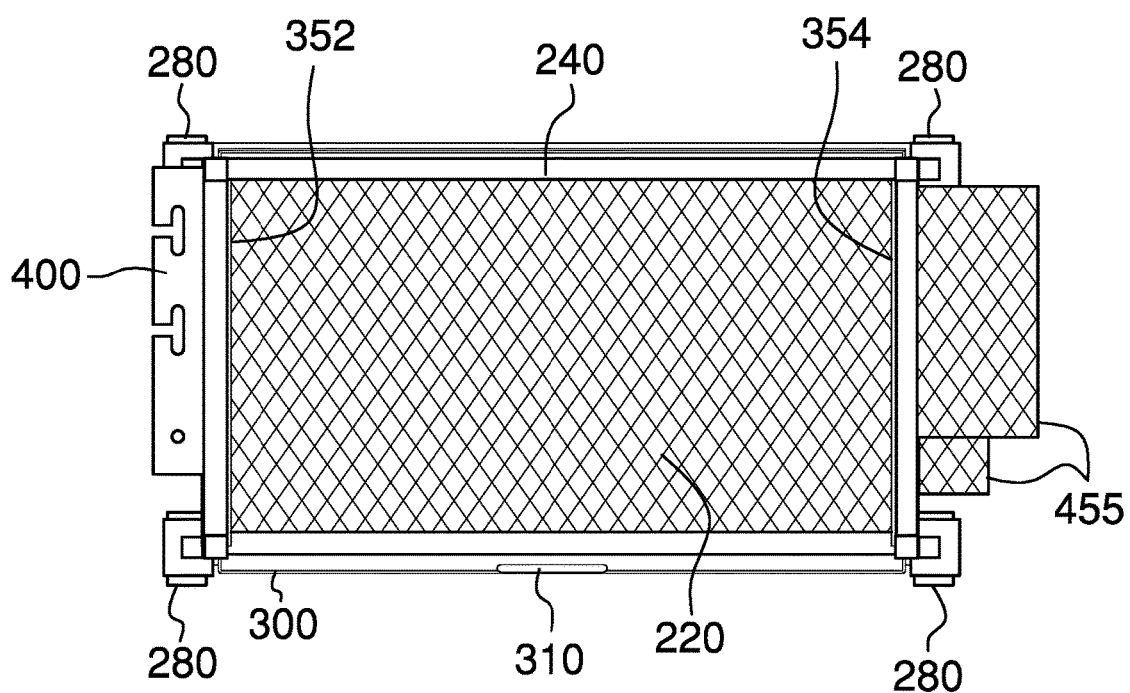
FIG. 3 is a top view of an embodiment of the disclosure.
Figure 4:
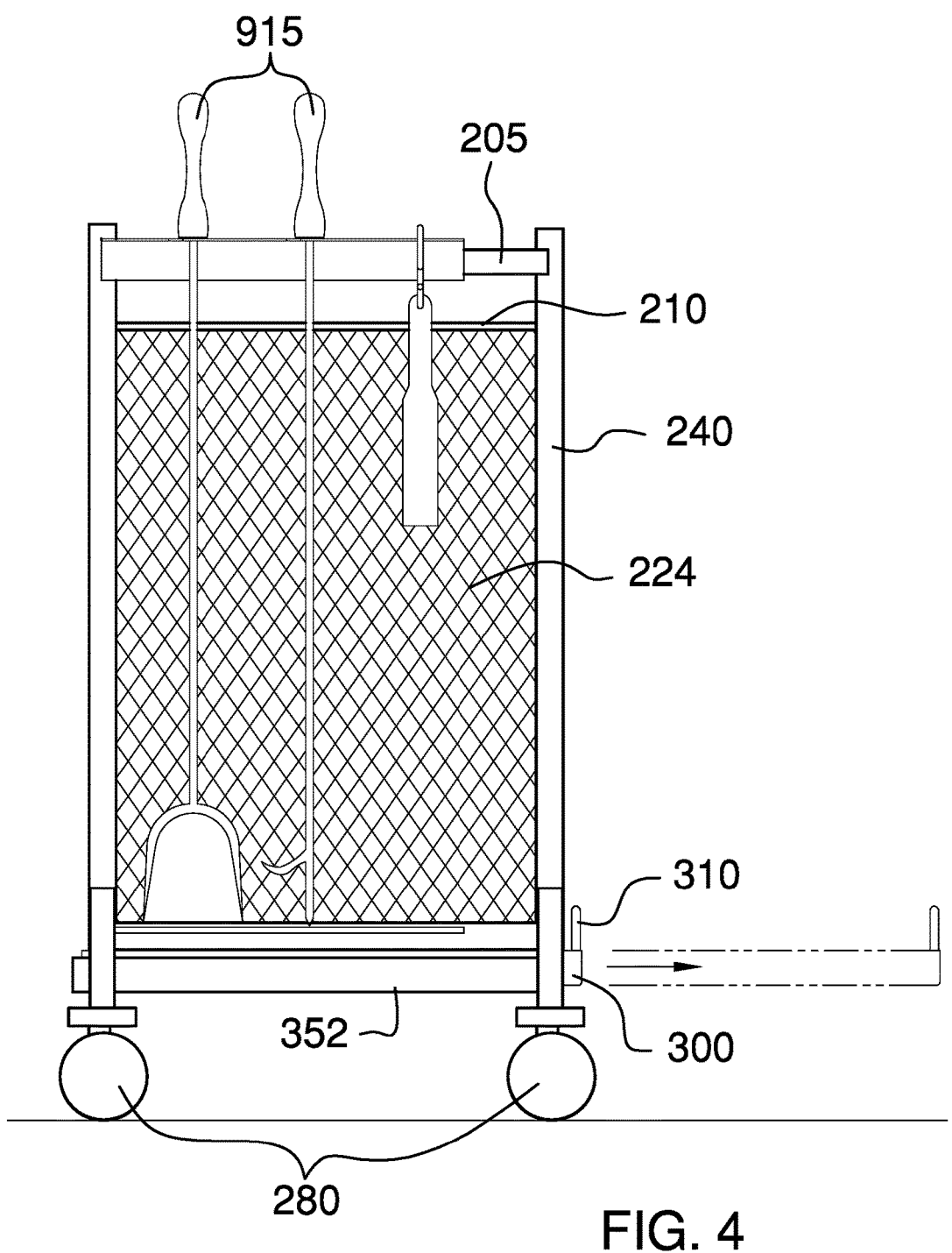
FIG. 4 is a side view of an embodiment of the disclosure.
Figure 5:
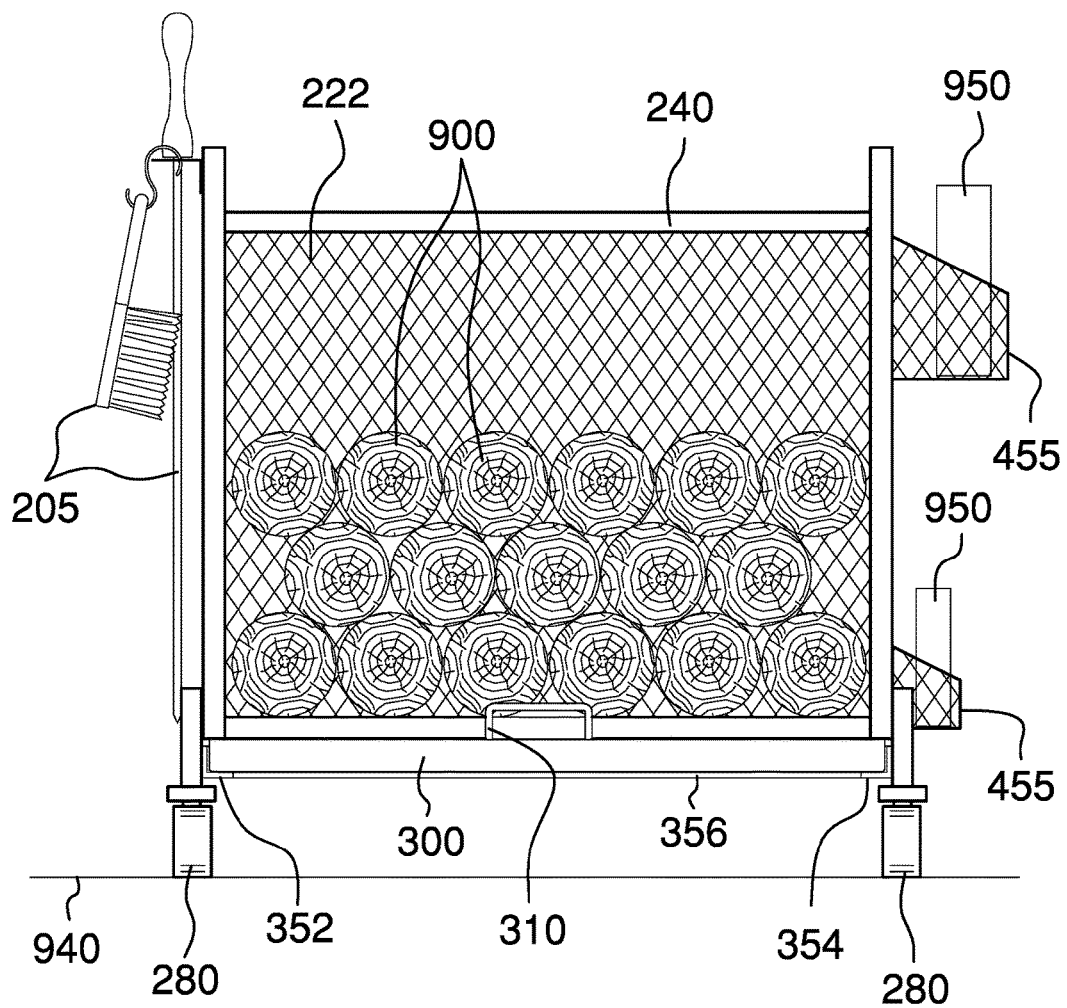
FIG. 5 is a front in-use view of an embodiment of the disclosure.

Detailed reference will now be made to a first potential embodiment of the disclosure, which is illustrated in FIGS. 1 through 5.

The firewood storage bin 100 (hereinafter invention) comprises a bin 200, a tray 300, a plurality of wheels 280, and a tool holder 400. The invention 100 may store firewood 900 for use in a fireplace or a wood-burning stove. The invention 100 may capture wood chips, bark, dirt or other debris falling from the firewood 900 and may thereby keep a floor 940 beneath the invention 100 clean. The invention 100 may be moveable by pushing the invention 100 over the floor 940 on the plurality of wheels 280.

The bin 200 may comprise a left side 224, a right side 226, a rear side 222, and a bottom side 220. The bin 200 may provide storage space for the firewood 900. The bin 200 may be the shape of a right rectangular prism. The left edge of the rear side 222 may be coupled to the rear edge of the left side 224. The right edge of the rear side 222 may be coupled to the rear edge of the right side 226. The bottom edge of the rear side 222 may be coupled to the rear edge of the bottom side 220. The bottom edge of the left side 224 may be coupled to the left edge of the bottom side 220. The bottom edge of the right side 226 may be coupled to the right edge of the bottom side 220. The top and front sides of the bin 200 may be open to provide access to the firewood 900.

The left side 224, the right side 226, the rear side 222, and the bottom side 220 may each comprise an open grillwork 230 that is supported by a metal tubing frame 240. In some embodiments, the open grillwork 230 on the left side 224, the right side 226, the rear side 222 and the bottom side 220 may be expanded metal. In some embodiments, the bottom side 220 may comprise one or more cross braces 245 to support the weight of the firewood 900.

In some embodiments, the metal tubing frame 240 at the top of the left side 224, the metal tubing frame 240 at the top of the right side 226, or both may be elevated above the open grillwork 230 to form a push handle 205. The push handle 205 may be used to move the invention 100 by grasping the push handle 205 and pushing or pulling the invention 100. In such embodiments, the top of the open grillwork 230 below the push handle 205 may be terminated by an armature or additional framing 210.

The tray 300 may be a pan that is removably mounted beneath the bin 200 to catch debris falling from the firewood 900. The tray 300 may be held in place by a plurality of tray holders. In some embodiments, the tray 300 may comprise a tray handle 310 located on the front of the tray 300 to aid in the removal of the tray 300. The plurality of tray holders may be angled armatures coupled to the bin 200. Each of the plurality of tray holders may extend downwards from the bin 200 by a distance that is at least the height of the tray 300. Each of the plurality of tray holders may then turn 90 degrees towards the center of the invention 100 to form a supporting ledge for the tray 300.

A left tray holder 352 may be located on the left underside of the bin 200 and may support the left side of the tray 300. A right tray holder 354 may be located on the right underside of the bin 200 and may support the right side of the tray 300. The left tray holder 352 and the right tray holder 354 may be separated from each other by a distance that is at least as large as the width of the tray 300. In some embodiments, a rear tray holder 356 may be located on the rear underside of the bin 200. The rear tray holder 356 may support the rear of the tray 300 and may position the tray 300 by acting as a stop for rearward motion of the tray 300.

The plurality of wheels 280 may be mounted at a level below the bin 200 at each corner of the bottom side 220 of the bin 200. The plurality of wheels 280 may reduce friction between the bin 200 and the floor 940 and thus allow the invention 100 to be moved. In some embodiments, at least two of the plurality of wheels 280 may swivel around a vertical axis to change their direction of travel.

The tool holder 400 may provide storage for fireplace tools 915. The tool holder 400 may be mounted on the top left or right side of the bin 200. The tool holder 400 may extend horizontally from the exterior side of the bin 200 and may comprise one or more apertures 405 or one or more cutouts 410 adapted to accept the fireplace tools 915. As non-limiting examples, the fireplace tools 915 may comprise a poker, a pair of tongs, bellows, a shovel, or a broom, or a brush.

In some embodiments, the invention 100 may further comprise one or more side storage areas. The one or more side storage areas may be used to store accessories 950 used in conjunction with the fireplace or the wood burning stove. As non-limiting examples, the accessories 950 may comprise matches, lighters, fire starter sticks, or fire coloring agents. The one or more side storage areas may be one or more shelves 455, with or without walls. In some embodiments, the one or more shelves 455 may be made of the open grillwork 230 that is used to make the left side 224, the right side 226, the bottom side 220, and the rear side 222.

In use, the invention 100 may be pushed to a location where it may be loaded with the firewood 900 and the bin 200 may be loaded. As a non-limiting example, the invention 100 may be pushed to be adjacent to an exterior door where the firewood 900 may be brought inside and placed in the bin 200. The invention 100 may then be rolled, using the plurality of wheels 280 and the push handle 205, to the fireplace or the wood burning stove. The invention 100 may be left at that location as the firewood 900 is consumed in the fireplace or the wood burning stove. As the firewood 900 is removed from the bin 200, the wood chips, the bark, and the dirt knocked loose from the firewood 900 may fall to the bottom side 220 of the bin 200 and through the bottom side 220 to the tray 300, where it will be caught. The tray 300 may periodically be removed and dumped to dispose of the debris. The fireplace tools 915 and the accessories 950 may be stored in the tool holder 400 and the one or more side storage areas, respectively. The fireplace tools 915 and the accessories 950 may be removed, used, and replaced as needed.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, an "aperture" is an opening in a surface. Aperture may be synonymous with hole, slit, crack, gap, slot, or opening.

As used in this disclosure, a "brush" is a device comprising a plurality of bristles set into a handle or a base that is used for grooming, sweeping, smoothing, scrubbing, cleaning, or painting.

As used herein, the words "couple", "couples", "coupled" or "coupling", refer to connecting, either directly or indirectly, and does not necessarily imply a mechanical connection.

As used in this disclosure, a "door" is a movable or removable barrier that is attached to the wall of a room or the surface of a container for the purpose of allowing or preventing access through an aperture into the room or container.

As used herein, "expanded metal" refers to a type of sheet metal that has been cut and stretched to form a regular pattern (often diamond-shaped) of metal mesh-like material As used in this disclosure, the word "exterior" is used as a relational term that implies that an object is not located or contained within the boundary of a structure or a space.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, a "tool" is a device, an apparatus, or an instrument that is used to carry out an activity, operation, or procedure.

As used in this disclosure, a "tube" is a hollow cylindrical device that is used for transporting liquids and/or gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline they are said to be aligned. When the centerlines of two tubes are perpendicular to each other, the tubes are said to be perpendicular to each other. As used here, "tubing" refers to a tube that is flexible or resilient.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A firewood storage bin comprising:
a bin, a tray, a plurality of wheels, and a tool holder;
wherein the firewood storage bin stores firewood for use in a fireplace or a wood burning stove;
wherein the firewood storage bin captures wood chips, bark, dirt or other debris falling from the firewood and thereby keeps a floor beneath the firewood storage bin clean;
wherein the firewood storage bin is moveable by pushing the firewood storage bin over the floor on the plurality of wheels;
wherein the bin comprises a left side, a right side, a rear side, and a bottom side;
wherein the bin provides storage space for the firewood;
wherein the left edge of the rear side is coupled to the rear edge of the left side;
wherein the right edge of the rear side is coupled to the rear edge of the right side;
wherein the bottom edge of the rear side is coupled to the rear edge of the bottom side;
wherein the bottom edge of the left side is coupled to the left edge of the bottom side;
wherein the bottom edge of the right side is coupled to the right edge of the bottom side;
wherein the top and front sides of the bin are open to provide access to the firewood;
wherein the left side, the right side, the rear side, and the bottom side each comprise an open grillwork that is supported by a metal tubing frame;
wherein the metal tubing frame at the top of the left side, the metal tubing frame at the top of the right side, or both are elevated above the open grillwork to form a push handle;
wherein the push handle is used to move the firewood storage bin by grasping the push handle and pushing or pulling the firewood storage bin;
wherein the top of the open grillwork below the push handle is terminated by an armature or additional framing;
wherein the tray is a pan that is removably mounted beneath the bin to catch debris falling from the firewood;
wherein the tray is held in place by a plurality of tray holders.

2. The firewood storage bin according to claim 1 wherein the bin is the shape of a right rectangular prism.

3. The firewood storage bin according to claim 1 wherein the open grillwork on the left side, the right side, the rear side and the bottom side are expanded metal.

4. The firewood storage bin according to claim 1 wherein the bottom side comprises one or more cross braces to support the weight of the firewood.

5. The firewood storage bin according to claim 1 wherein the tray comprises a tray handle located on the front of the tray to aid in the removal of the tray.

6. The firewood storage bin according to claim 1 wherein the plurality of tray holders are angled armatures coupled to the bin;
wherein each of the plurality of tray holders extend downwards from the bin by a distance that is at least the height of the tray;
wherein each of the plurality of tray holders then turn 90 degrees towards the center of the firewood storage bin to form a supporting ledge for the tray.

7. The firewood storage bin according to claim 6 wherein a left tray holder is located on the left underside of the bin and supports the left side of the tray;
wherein a right tray holder is located on the right underside of the bin and supports the right side of the tray;
wherein the left tray holder and the right tray holder are separated from each other by a distance that is at least as large as the width of the tray.

8. The firewood storage bin according to claim 7 wherein a rear tray holder is located on the rear underside of the bin;
wherein the rear tray holder supports the rear of the tray and positions the tray by acting as a stop for rearward motion of the tray.

9. The firewood storage bin according to claim 7 wherein the plurality of wheels are mounted at a level below the bin at each corner of the bottom side of the bin;
wherein the plurality of wheels reduce friction between the bin and the floor and thus allow the firewood storage bin to be moved.

10. The firewood storage bin according to claim 9 wherein at least two of the plurality of wheels swivel around a vertical axis to change their direction of travel.

11. The firewood storage bin according to claim 9
wherein the tool holder provides storage for fireplace tools;
wherein the tool holder is mounted on the top left or right side of the bin;
wherein the tool holder extends horizontally from the exterior side of the bin and comprises one or more apertures or one or more cutouts adapted to accept the fireplace tools.

12. The firewood storage bin according to claim 11
wherein the firewood storage bin further comprises one or more side storage areas;
wherein the one or more side storage areas are used to store accessories used in conjunction with the fireplace or the wood burning stove;
wherein the one or more side storage areas are one or more shelves, with or without walls.

13. The firewood storage bin according to claim 12 wherein the one or more shelves are made of the open grillwork that is used to make the left side, the right side, the bottom side, and the rear side.

* * * * *